US012698375B2

(12) United States Patent
Lee et al.

(10) Patent No.: US 12,698,375 B2
(45) Date of Patent: Aug. 4, 2026

(54) METHOD FOR PREPARING POLYIMIDE AEROGEL HAVING LOW DIELECTRIC PROPERTIES, HIGH INSULATION, AND HIGH STRENGTH, AND POLYIMIDE AEROGEL PRODUCED THEREFROM

(71) Applicant: KOREA ELECTROTECHNOLOGY RESEARCH INSTITUTE, Changwon-si (KR)

(72) Inventors: Dae Ho Lee, Changwon-si (KR); Moon Jung Jo, Changwon-si (KR); Se Won Han, Changwon-si (KR); Seung Gun Yu, Paju-si (KR); Hyo Yul Park, Changwon-si (KR)

(73) Assignee: KOREA ELECTROTECHNOLOGY RESEARCH INSTITUTE (KR)

( * ) Notice: Subject to any disclaimer, the term of this patent is extended or adjusted under 35 U.S.C. 154(b) by 850 days.

(21) Appl. No.: 18/102,921

(22) Filed: Jan. 30, 2023

(65) Prior Publication Data

US 2023/0174735 A1 Jun. 8, 2023

Related U.S. Application Data

(63) Continuation of application No. PCT/KR2020/012664, filed on Sep. 18, 2020.

(30) Foreign Application Priority Data

Jul. 30, 2020 (KR) ........................ 10-2020-0095248

(51) Int. Cl.
C08J 9/28 (2006.01)

(52) U.S. Cl.
CPC ........... *C08J 9/28* (2013.01); *C08J 2205/026* (2013.01); *C08J 2205/05* (2013.01); *C08J 2379/08* (2013.01)

(58) Field of Classification Search
CPC .... C08J 9/28; C08J 2205/026; C08J 2205/05; C08J 2379/08; C08J 2201/026; C08J 2201/0543; C08G 73/10
See application file for complete search history.

(56) References Cited

U.S. PATENT DOCUMENTS 9,309,369 B1 * 4/2016 Meador .................... C08J 9/283
9,650,487 B1 * 5/2017 Guo ....................... C08J 9/0061
(Continued)

FOREIGN PATENT DOCUMENTS

CN 108530673 A * 9/2018 ............... C08J 9/28
KR 1020090008084 A 1/2009
(Continued)

OTHER PUBLICATIONS

Guo et al., "Tailoring Properties of Cross-Linked Polyimide Aerogels for Better Moisture Resistance, Flexibility, and Strength," ACS Applied Materials and Interfaces, 2012, 4, 5422-5429 (Year: 2012).*
(Continued)

*Primary Examiner* — K. Boyle
(74) *Attorney, Agent, or Firm* — Park & Associates IP Law Office

(57) ABSTRACT

The present invention relates to: a method for producing a polyimide aerogel having low dielectric properties, high insulation, and high strength; and a polyimide aerogel prepared therefrom. The present invention has the technical gist of a method for producing a polyimide aerogel having low dielectric properties, high insulation, and high strength, and a polyimide aerogel prepared therefrom, the method including: a first step of preparing a solvent; a second step of preparing a polyamic acid resin by reacting a diamine-based monomer with an acid anhydride monomer in a solvent; a third step of preparing a polyimide resin solution by imidizing the polyamic acid resin at 150 to 200° C.; a fourth step of preparing a polyimide wet gel by mixing a cross-
(Continued)

linking agent and an acid with the polyimide resin solution; and a fifth step of preparing a polyimide aerogel by replacing the solvent contained in the polyimide wet gel with a main substitution solvent and a minor substitution solvent and then drying, wherein, in the fifth step, the main substitution solvent and the minor substitution solvent are each added to the polyimide wet gel in a stepwise manner to produce a polyimide aerogel having the porosity of 80 to 85 vol % while forming a skeletal structure having nano-pores through solvent-exchange.

6 Claims, 5 Drawing Sheets

(56) References Cited

U.S. PATENT DOCUMENTS

| | | | | |
|---|---|---|---|---|
| 10,723,857 B1 * | 7/2020 | Viggiano | ........... | C08G 73/1067 |
| 2004/0132845 A1 * | 7/2004 | Rhine | ........................ | C08J 9/28 |
| | | | | 521/82 |

2017/0121483  A1      5/2017  Poe et al.
2018/0112054  A1      4/2018  Steiner, III et al.

FOREIGN PATENT DOCUMENTS

| | | |
|---|---|---|
| KR | 1020160014664 A | 2/2016 |
| KR | 1020200047360 A | 5/2020 |
| WO | 2019112855 A1 | 6/2019 |

OTHER PUBLICATIONS

International Search Report (PCT/KR2020/012664), WIPO, Apr. 23, 2021.

Wu, Q. et al. A green and scalable method for producing high-performance polyimide aerogels using low-boiling-point solvents and sublimation drying. Polymer Journal. 2015, article No. 1, internal pp. 1-7.

* cited by examiner

S-4800 10.0kV 8.3mm x30.0k SE(M)                    1.00um

S-4800 10.0kV 8.5mm x30.0k SE(M)                    1.00um

METHOD FOR PREPARING POLYIMIDE AEROGEL HAVING LOW DIELECTRIC PROPERTIES, HIGH INSULATION, AND HIGH STRENGTH, AND POLYIMIDE AEROGEL PRODUCED THEREFROM

REFERENCE TO RELATED APPLICATIONS

This is a continuation of International Patent Application PCT/KR2020/012664 filed on Sep. 18, 2020, which designates the United States and claims priority of Korean Patent Application No. 10-2020-0095248 filed on Jul. 30, 2020, the entire contents of which are incorporated herein by reference.

FIELD OF THE INVENTION

The present invention relates to a method of manufacturing a polyimide aerogel having a low dielectric constant, high electrical insulation performance, and high mechanical strength and to a polyimide aerogel prepared thereby.

BACKGROUND OF THE INVENTION

Polyimide is used in various industrial fields such as automobiles, aviation, ships, electronics, displays, and semiconductor devices due to its excellent mechanical strength and high electrical insulation performance as long as the highest level of heat resistance among organic polymers. In particular, polyimide is widely used to form an electrical insulating layer for a flexible printed circuit board (FPCB), a substrate of an integrated circuit, etc. With the accelerating recent trend of high-speed signaling, there is a growing demand for insulators with a lower dielectric constant and a lower loss tangent to minimize signal loss.

For this reason, in recent years, research has been actively conducted on technology for manufacturing highly porous aerogels from polyimide. An aerogel is a three-dimensional reticular structure having nanoscale pores and has attracted much attention mainly as a thermal insulation material. Since the highly porous structure can dramatically reduce the dielectric constant, research is being actively conducted on applications as a low dielectric material. Specifically, since polyimide aerogels have stronger mechanical strength than conventional silica aerogels and higher heat resistance than other organic polymer aerogels, the polyimide aerogels are highly versatile in various industrial applications.

Recently, NASA has developed polyimide aerogels, and Blueshift International Materials and Aerogel Technologies have produced polyimide aerogels. On the other hand, literatures such as US 2018/0112054 A1 titled "Aerogel Materials and Methods for Their Production" and US 2017/0121483 A1 titled "Highly Branched Non-crosslinked Aerogel, Methods of Making, and Uses Thereof" disclose technology for manufacturing polyimide aerogels using supercritical drying or general drying.

The supercritical drying method has the advantage of inhibiting shrinkage and pore destruction when drying a solvent, thereby forming highly porous aerogels. However, the supercritical drying method has problems of high cost and extreme risk in the process. With regard to the general drying using a conventional oven, a drying method using a low-surface tension solvent having a fluorine group is disclosed. The method has problems in that it takes a long process time of 5 to 10 days in the process of replacing the solvent before drying, and a special solvent having a fluorine group is used, which are disadvantageous in terms of process time and cost.

Therefore, for increase in industrial production efficiency of polyimide aerogels, it is important to avoid using the supercritical drying method but to use a vacuum drying method or an ambient drying method. In addition, it is advantageous to shorten the solvent process which usually takes a long time. A related art literature, Korean Patent Application Publication No. 10-2020-0047360 titled "Polyimide Aerogel Controlled in Particle Size or Pore Structure and Manufacturing Method Thereof", discloses a method of manufacturing polyimide aerogels which are controlled in particle size and pore structure by high-temperature synthesis of particulate polyimide resin and a solution exchanging process using a complex organic solvent, by using a typical vacuuming process.

However, for more versatile industrial applications, it is necessary to manufacture polyimide aerogels with high porosity, high electrical insulation performance, and high mechanical strength. Therefore, it is an important time for research on technology development to simplify the process of manufacturing polyimide aerogels and to improve the insulation performance, strength, and heat resistance of low-dielectric aerogels produced by the method.

SUMMARY OF THE INVENTION

The present invention has been made to solve the problems occurring in the related art, and objectives of the present disclosure are to provide a method of manufacturing a highly porous polyimide aerogel having a low dielectric constant, high electrical insulation performance, high mechanical strength, and a skeletal structure with nano-sized pores, and a polyimide aerogel manufactured by the method. The method includes synthesizing a solution-type polyimide resin through high-temperature polymerization, synthesizing a polyimide wet gel using a crosslinking agent and an acid, performing solvent substitution through solution interface control, and drying.

In order to solve the technical problems described above, the present invention provides a method of manufacturing a polyimide aerogel having a low dielectric constant, high insulation performance, and high strength, the method including: a first step of preparing a solvent; a second step of reacting a diamine-based monomer and a acid anhydride monomer to produce a polyamic acid resin; a third step of preparing a polyimide resin solution by imidizing the polyamic acid resin at a temperature in a range of 150° C. to 200° C.; a fourth step of preparing a polyimide wet gel by mixing a crosslinking agent and an acid with the polyimide resin solution; and a fifth step of preparing the polyimide aerogel by drying after substituting the solvent contained in the polyimide wet gel with a main substituent solvent and a sub-substituent solvent. In the fifth step, the main substituent solvent and the sub-substituent solvent are added step by step to the polyimide wet gel to produce, through solvent replacement, the polyimide aerogel with a nano-pore skeletal structure and a porosity of 80% to 85% by volume.

In the present invention, the solvent used in the first step has higher solubility for the polyimide resin solution of the third step.

In the present invention, the acid used in the fourth step may be one or more acids selected from among acetic acid, lactic acid, butyric acid, benzoic acid, citric acid, phosphoric acid, and hydrochloric acid.

In the present invention, the difference in Hansen solubility parameter (HSP) between the solvent of the polyimide resin solution and the main substituent solvent is equal to or greater than 14.

In the present invention, the difference in Hansen solubility parameter (HSP) between the solvent of the polyimide resin solution and the sub-substituent solvent is less than 14.

In the present invention, the main substituent solvent is any one or more substituents selected from among hexane, cyclohexane, octane, pentane, and perfluorohexane, and the sub-sub-substituent solvent is any one or more substituents selected from among toluene, tetrahydrofuran, cyclohexanone, and methyl isobutyl ketone.

To solve a further technical problem, the present invention provides a polyimide aerogel manufactured by the method.

The method of manufacturing a polyimide aerogel having a low dielectric constant, high electrical insulation performance, and high mechanical strength, according to the present invention, and the polyimide aerogel manufactured by the method according to the present invention have the advantages described below.

First, since a solution-type polyimide resin, i.e., polyimide resin solution, having a polyimide structure is synthesized by a high-temperature polymerization reaction, it is possible to solve a storage stability problem that occurs when using polyamic acid.

Second, since the main substituent solvent resulting from forming the gel structure in the solvent substitution process and the sub-substituent solvent that is compatible with the main substituent solvent are sequentially used, it is possible to obtain a highly porous polyimide aerogel having a porosity 80% by volume or higher through a fast solvent substitution process and a general drying method.

Third, by using the polyimide resin in the form of a solution and adjusting the introduction of substituent solvents in a manner to sequentially add the main substituent solvent and the sub-substituent solvent step by step, highly porous polyimide aerogels having a nano-pore skeletal structure can be synthesized through final drying. Since the produced aerogels have a low dielectric constant, high electrical insulation performance, and high mechanical strength, the aerogels can find a variety of applications such as low dielectric substrates, insulating protective films, insulating materials, sound-absorbing materials, membranes, and adsorbents.

DETAILED DESCRIPTION OF THE INVENTION

Hereinafter, the present disclosure will be described in detail.

Prior to giving a description, polyimide aerogels do not necessarily have a high porosity, but may have a wide range of porosities, from a high porosity to a low porosity, depending on the applications thereof. Therefore, practically, the technique of controlling the porosity or pore structure while reducing process time and cost is important.

In the literature, Korean Patent Application Publication No. 10-2020-0047360, titled "Polyimide Aerogel Controlled Particle Size Or Pore Structure, and Method of Manufacturing Same", it is disclosed that in a method of manufacturing polyimide aerogels from particulate polyimide resin, industrial inexpensive solvents are used for solvent substitution, the process time for solvent substitution is reduced, and a general drying process such as vacuum drying is used. In addition, a complex organic solvent in which two types of solvents are mixed is used for solvent substitution, which enables porosity control and provides a high porosity.

However, in order to further increase the industrial applicability, technological advances in many aspects are still needed. First, the porosity of aerogels has to be further increased. Second, the intrinsic mechanical vulnerability of the highly porous structure has to be overcome. Third, it is necessary to relatively increase physical properties such as mechanical strength, electrical insulation performance, and heat resistance for the same porosity.

Conventionally, it was possible to control the porosity by solvent substitution using a particulate polyimide resin and a complex organic solvent. In terms of obtaining aerogels with high porosity and high strength, it is advantageous to use a solution-type polyimide resin rather than a particulate polyimide resin. The present invention is characterized in using a solvent substitution process unlike the conventional technique of using a complex organic solvent to manufacture polyimide aerogels having a high porosity, high mechanical strength, and high electrical insulation performance. Accordingly, the present invention provides a new method of manufacturing polyimide aerogels having a low dielectric constant due to high porosity, high mechanical strength, and high electrical insulation performance.

Figure 1:
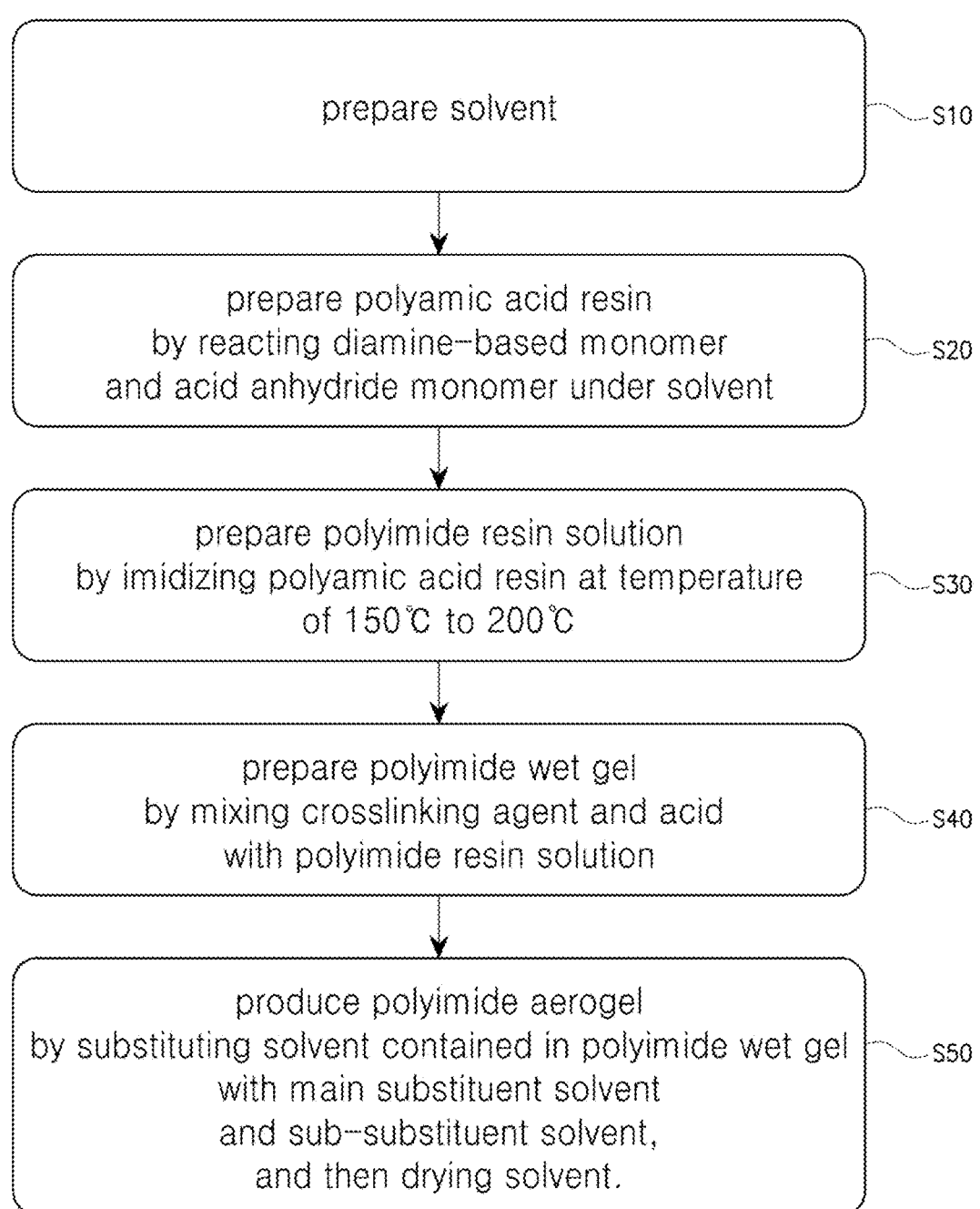
FIG. 1 is a flowchart illustrating a method of manufacturing polyimide aerogels, according to the present invention.

FIG. 1 is a flowchart illustrating a method of manufacturing polyimide aerogels, according to the present invention. Referring to FIG. 1, a method of manufacturing polyimide aerogels, according to the present invention, includes: a first step S10 of preparing a solvent; a second step S20 of preparing a polyamic acid resin by reacting an acid anhydride monomer with a diamine-based monomer in the presence of a solvent; a third step S30 of imidizing the polyamic acid resin at a temperature in the range of from 150° C. to 200° C. to produce a polyimide resin solution; a fourth step S40 of preparing a polyimide wet gel by mixing a crosslinking agent and an acid with the polyimide resin solution; and a fifth step S50 of preparing polyimide aerogels by substituting a solvent in the polyimide wet gel with a main substituent solvent and a sub-substituent solvent and then drying the polyimide wet gel.

According to the method described above, the first step S10 is to prepare a solvent.

The solvent is a material capable of dissolving the monomers. It is preferable to use a solvent capable of dissolving the polyimide resin solution prepared in the third step. The solvent used in the first step preferably has higher solubility than the polyimide resin solution used in the third step.

Examples of the solvent include N-methylpyrrolidone (NMP), N,N-dimethylformamide (DMF), N,N-dimethylacetamide (DMAc), N,N-diethylformamide, and N, N-diethyl acetamide.

Particularly, since the high temperature polymerization is performed in the third step, it is preferable that the solvent used in the first step is a high boiling point solvent having a boiling point higher than 100° C. (preferably higher than 150° C.) to prevent easy volatilization at high temperatures. In addition, since water generated during the high temperature polymerization of the third step is to be removed, it is preferable to select a solvent having a boiling point higher than water. However, the solvent used in the first step will be interpreted in the same manner as the term "synthetic solvent" to be described later.

Next, in the second step S20, the diamine-based monomer and the acid anhydride monomer are reacted under a solvent to produce a polyamic acid resin.

That is, the polyamic acid resin is prepared by adding and reacting diamine-based monomers and acid anhydride monomers to the solvent in nitrogen ambient at room temperature or at low temperatures (10° C. to 25° C.).

The diamine-based monomers are preferably selected from the group consisting of aromatic diamines, aliphatic diamines, alicyclic diamines, silicon-based diamines, and mixtures thereof, include at least one of diaminopyrimidine, hexamethylene diamine, bis[4-(3-aminopropenoxy)phenyl] sulfone, bis[4-(3-aminophenoxy)phenyl]hexafluoropropane, 1,4-bis(4-aminophenoxy)benzene, bis[4-(3-aminophenoxy) phenyl] propane, 3,5-bis(4-am inophenoxy)benzoic acid, 4,4'-bis(4-aminophenoxy)biphenyl glycol, 4,4'-bis(4-amino-phenoxy)neopentyl glycol, bis(4-aminophenyl)ether(bis(4-aminophenyl)ether), 1,4-butanediol, bis(3-aminopropyl) ether, 1,4-cyclohexanediamine, 6,6'-diamino-2,2'-bipyridyl ammeline, 2,2'-benzidinedisulfonic acid, bis(3-amino-4-hy-droxyphenyl)sulfone, bis(2-aminophenyl)sulfide, bis(3-ami-nophenyl)sulfide, bis(4-aminophenyl)sulfone, 2,2'-bis(trif-luoromethyl) benzidine, 2,6-diam inoanthraquinone, 4,4'-diaminobenzanilide, 3,5-diaminobenzoic acid, 4,4'-diaminodiphenyl ether, 4,4'-diaminodiphenylmethane, 2,4-diamino-6-hydroxypyrimidine, 4,6-diamino mercaptopyrimidine, 4,4'-diaminooctafluorobiphenyl, 1,3-diamino-2-propanol, 2,6-diaminopyridine, bis(aminopropy-l)tetramethyldisiloxane, and amine-modified polydimethyl-siloxane (silicone).

When the solubility decreases during the high temperature polymerization process of the third step, precipitation of the excess occurs, or a particulate polyimide resin is formed. Therefore, to synthesize a solution-type polyimide resin, it is preferable to use diamine monomers having one or more highly soluble functional groups selected from among such as a carboxyl group, a sulfone group, an amide group, and an ether group, among the above-described diamine-based monomers.

As with diamine-based monomers, to prevent solubility degradation in the imidization reaction in a solution and to obtain a solution-type polyimide resin, the acid anhydride monomers for forming imides are preferably used in a predetermined amount. In this case, preferably, acid anhy-dride monomers having one or more highly soluble func-tional groups selected from among a sulfone group, a carbonyl group, an ether group, and a fluorine group may be used.

The acid anhydride monomers may include one or more monomers selected from among 3,3',4,4'-benzophenonetet-racarboxylic dianhydride, 4,4'-biphthalic dianhydride, 1,2, 4,5-cyclohexanetracarboxylic dianhydride, 3,3',4,4'-diphe-nylsulfonetracarboxylic dianhydride, ethylenediaminetetraacetic dianhydride, naphthalene-1,4,5, 8-tetracarboxylic dianhydride, 3,4,9,10-perylenetetracar-boxylic dianhydride, pyromellitic dianhydride and diethyl-enetriaminepentaacetic dianhydride.

The molar ratio of the acid anhydride monomer and the diamine-based monomer may be controlled to adjust the molecular weight of the produced polyimide resin. Prefer-ably, the molar ratio may be in the range of from 1.0 to 1.5.

In the second step, polar groups may be introduced into the diamine-based monomer, the acid anhydride monomer, or both. This enables the polyimide resin prepared in the third step to be dissolved in the solvent used in the first step, so that a solution-type polyimide resin can be obtained.

Next, in the third step S30, the polyamic acid resin undergoes imidization at a temperature in the range of from 150° C. to 200° C. to produce a polyimide resin solution.

Specifically, in the third step, the polyamic acid resin undergoes a high temperature polymerization reaction (i.e., imidization of the polyamic acid resin) in a temperature range of 150° to 200° C. to synthesize a polyimide resin solution. The amic acid structure of the polyamic acid resin prepared in the second step undergoes imidization through the high temperature polymerization reaction in a tempera-ture range of 150° C. to 200° C., so that the polyimide resin solution is synthesized. However, it is preferable to be equipped with ancillary equipment such as a condenser, a receiver, etc. to remove water generated during the imidiza-tion reaction occurring in a solution.

In this case, since the imidization reaction is not suffi-ciently performed on the amic acid structure at a temperature lower than 150° C. On the other hand, when the imidization reaction is performed at a temperature higher than 200° C., the effect of improving imidization efficiency is not exhib-ited compared to the case where the high-temperature polymerization reaction is performed below 200° C., the high temperature polymerization is preferably performed at temperatures of 150° C. to 200° C.

Particularly, since either or both of the diamine-based monomers and the acid anhydride monomers used in the second step include a polar group in a predetermined amount, the solubility degradation does not occur and thus particle formation does not occur while the high-temperature polymerization reaction progresses. Therefore, it is possible to produce a solution-type polyimide resin.

Next, in the fourth step S40, the polyimide wet gel is prepared by mixing the crosslinking agent and the acid with the polyimide resin solution.

In the fourth step, the polyimide resin solution is cross-linked by a multifunctional group that is tri- or higher functional. In this step, acid is added as an additive to enhance the crosslinking reaction.

Concerning this, the crosslinking agent functions to enable the formation of a network structure by crosslinking the polyimide resin in the polyimide resin solution. As the crosslinking agent, one or more amine monomers having a trivalent or tetravalent functional group, such as melamine, triaminopyridine, trisaminoethylamine, bis(hexamethylene) triamine, diethylenetriamine, tris(aminophenyl)methane, and pararosaniline base may be used. In addition, inorganic nanoparticles such as silica, titania, and alumina, treated with amines, also can be used.

The acid used along with the crosslinking agent facilitates the crosslinking reaction caused by the crosslinking agent, thereby facilitating the formation of wet gels. Organic acids or inorganic acids to shift the pH to an acidic range may be used. For example, acetic acid, lactic acid, butyric acid, benzoic acid, citric acid, phosphoric acid, and/or hydrochloric acid may be used. However, it is preferable to use an organic acid that is compatible with resins composed of solvents and polyimides and which does not cause additional chemical changes and degradation. When an acid is added, a polyimide wet gel can be obtained at a relatively lower content of crosslinking agent.

In this case, the crosslinking reaction is performed at a temperature in the range of from 20° C. to 100° C. When the crosslinking reaction is performed at a temperature below 20° C., it takes a long time to produce a polyimide wet gel. When the crosslinking reaction is performed at a temperature condition exceeding 100° C., it is preferable to use an additional high pressure sealing equipment for preventing the evaporation of the solvent and for dealing with an increase in the internal pressure. Most preferably, the crosslinking reaction is performed at a temperature in the range of 20° C. to 60° C.

After the crosslinking agent and the acid are introduced, the polyimide wet gel is formed in a form suitable depending on the purpose. The wet gel can be molded into a structure through a molding process or made into a film through a coating process. Eventually, the crosslinking is completed as the crosslinking agent is reacted with the polyimide resin solution to form the polyimide wet gel.

Finally, in the fifth step S50, the solvent contained in the polyimide wet gel is substituted with a main substituent solvent and a sub-substituent solvent, and then drying is performed to obtain polyimide aerogels as the end products.

Specifically, in the fifth step, the solvent introduced in the first step and included in the polyimide wet gel is substituted with a solvent having a low boiling point and a low surface tension, and then the solvent is removed by drying to form a polyimide aerogel. In the solvent substitution process, the main substituent solvent and the sub-substituent solvent are sequentially added step by step. Subsequently, the final drying is performed to produce the polyimide aerogel having a nano-pore skeletal structure. That is, in the solution substitution process in which the solvent used in the first step for preparation of the polyimide wet gel is substituted with a solvent having a low boiling point and a low surface tension, fast and easy solution substitution can be achieved within a short period of time through an interface control between the polyimide and the solution. In addition, in the solvent substitution process of the present invention, separate solvents with a low boiling point and a low surface tension are sequentially added rather than a complex organic solvent in which two solvents are mixed is added step by step.

In other words, the polyimide wet gel refers to a crosslinked gel containing the solvent introduced in the first step. In order to minimize pore shrinkage during drying, the high boiling point polar solvent retained in the polyimide wet gel can be substituted with solvents having a low boiling point and a low surface tension. In this case, the solvent substitution may not be performed in a manner that the required amount of the substituent solvent is directly added at one time. Preferably, the solvent substitution is performed in a manner that a portion of the required amount of the substituent solvent is mixed with the existing solvent introduced in the first step, and then the weight ratio of the substituent solvent to the existing solvent is gradually increased. However, in the solvent substitution process, the substituent solvent used to control the structure of the polyimide wet gel and the pore structure of the polyimide aerogel as an end product through the final drying will be interpreted to have the same meaning as the main substituent solvent.

Since the solvent having a low boiling point and a low surface tension used as the substituent solvent does not have affinities with polyimides, a microstructure is formed by phase separation during the solvent substitution process. In addition, various kinds of solvents can be used in many solvent substitution steps before reaching the last solvent substitution step. Depending on the type of substituent solvent, the structure of the produced polyimide wetting gels may vary. The formation of a polyimide wet gel structure in the solvent substitution process results in a pore structure after the final drying.

The less affinity the main substituent solvent has with polyimides, the more phase separation occurs. After the final drying, the nano-pore skeletal structure appears. On the other hand, when the main substituent solvent has a relatively good affinity with polyimides, finer phase separation occurs, resulting in the pore structure in the form of nanoparticles after the final drying.

As the main substituent solvent capable of forming a nanopore shape in the skeletal structure, one or more solvents among hexane, cyclohexane, octane, pentane, and perfluorohexane are preferably used.

On the other hand, the degree of affinity between a polymer and a solvent is expressed by the Hansen solubility parameter (HSP). In this case, the smaller the Ra value defined as the HSP distance obtained from the HSP values of the respective materials, the better the affinity. The larger the Ra value, the poorer the affinity.

The HSP values of polymers can be determined by observing solubility or swelling behavior for several solvents. Alternatively, the HSP value depending on the chemical structure of a polymer can be computationally predicted by the group contribution method, but this method has a disadvantage of providing inaccurate results.

The polyimide resin solution in the present invention refers to a resin state in which polyimide is dissolved in a solvent. Therefore, the affinity between the polyimide and the substituent solvent can be indirectly determined from the affinity of the polyimide with a synthetic solvent in which the polyimide is dissolved. The HSP value of each solvent and the HSP distance Ra between different solvents can be calculated. The substituent solvent as the main substituent solvent is a solvent having an Ra value of 14 or more with respect to the synthetic solvent. Therefore, it is preferable to use a solvent having an Ra value of 14 or more with the synthetic solvent or a mixed solvent thereof as the main substituent solvent to form a pore shape in the skeletal structure.

More preferably, when a solvent having a Ra value of 14 or more with respect to the synthetic solvent and exhibits no phase separation with respect to the synthetic solvent, or a mixed solution thereof is selected as the substituent solvent, the desired nano-pore skeletal structure can be obtained.

Since the main substituent solvent is a solvent exhibiting a relatively low affinity for polyimides and synthetic solvents, a solvent having a relatively good affinity for synthetic solvents and polyimides is required for the formation of gel structures and efficient solvent substitution. The solvent that helps the main substituent solvent to replace the existing solvent is referred to as a sub-substituent solvent.

In the case of performing the solvent substitution adding only the main substituent solvent substitution step by step to create the skeletal structure, without using the sub-substituent solvent, since the synthetic solvent is difficult to be completely substituted, the skeletal structure is created but there is a problem in that the synthetic solvent remains. Due to the remaining synthetic solvent, pore shrinkage occurs during the subsequent drying, and it is difficult to obtain a structure with a high porosity. Therefore, it is imperative that the sub-substituent solvent be used to obtain the skeletal structure with a high porosity.

Preferably, as the sub-substituent solvent, any one or more of toluene, tetrahydrofuran, cyclohexanone, and methyl isobutyl ketone are preferably used.

Preferably, the sub-substituent solvent has a Ra value of less than 14 with respect to the synthetic solvent so that the sub-substituent solvent has a higher affinity for polyimides than the main-substituent solvent. In addition, the sub-substituent preferably has an Ra value of 10 or less with respect to the main-substituent solvent. The Ra value of 10 or less with respect to the main substituent solvent means a good affinity with the main substituent solvent.

The sub-substituent solvent may be used before or after the use of the main substituent solvent in the solvent substitution process, to provide advantages that the skeletal structure is easily formed by the main substituent solvent, the solvent substitution smoothly progresses, and the porosity is increased.

In addition, the sub-substituent solvent may be mixed with the main substituent solvent to inhibit the phase separation of the main substituent solvent from the synthetic solvent when there is a likelihood that the main substitution solvent exhibits phase separation with respect to the synthetic solvent. However, in this case, the substituent solvent that is a mixture of the sub-substituent solvent and the main substituent solvent needs to have a Ra value of 14 or higher with the synthetic solvent to form nanopores in the desired skeletal structure.

In the stepwise solvent substitution process of the fifth step, the existing solvent may be substituted with a solvent having a low boiling point and a low surface tension in the last solvent substitution step immediately before the drying process. Therefore, when the solvent can be easily and rapidly removed by drying, the pore shrinkage caused by capillary pressure can be minimized, and thus highly porous polyimide aerogels can be prepared. As such, in order to minimize pore shrinkage during the drying process, the substituent solvent used in the last solvent substitution step is referred to as a dry solvent.

Since the main substituent solvent is mostly a solvent with low boiling point and low surface tension, the main substituent solvent can be used as the dry solvent. However, when only the main substituent solvent is used in all the solvent substitution steps, it is difficult to obtain a high porosity because the synthetic solvent is not properly substituted. Therefore, it is preferable to perform step-by-step solvent substitution by sequentially the main substituent solvent, the sub-substituent solvent, and the main substituent solvent in this order.

Aside from the main substituent solvent, solvents with low surface tension and low boiling point can be used as the dry solvent. Preferably, it is efficient to use a solvent having a surface tension of 25 mN/m and a boiling point of 100° C. or lower as the dry solvent.

After the solvent substitution is completed, the solvent is then removed in various ways, such as supercritical drying, lyophilization, vacuum drying and atmospheric high temperature drying. In order to obtain a highly porous polyimide aerogel, the supercritical drying is most preferred. However, in terms of productivity and commerciality, it is preferable to use general vacuum drying or high-temperature ambient-pressure drying.

In a general vacuum or atmospheric pressure drying method, the drying temperature is in the range of from room temperature to 200° C. In order to minimize the structural breakdown caused by rapid solvent volatilization, it is preferable to dry at room temperature for an extended period of time or gradually increase the temperature when the drying temperature needs to be elevated.

In summary, according to the present invention, a solution-type polyimide resin is prepared through high-temperature polymerization, the gel structure is controlled by a solution interface control in a solvent substitution process, and a polyimide aerogel having a nano-pore structure can be manufactured. Therefore, the polyimide aerogel has an advantage of high mechanical strength as well as high electrical insulation performance and low dielectric constant.

Hereinafter, examples of the present invention will be described in detail. The examples below are provided only to aid understanding of the present invention and thus should not be construed as limiting to the scope of the present invention.

Example 1

Synthesis of Solution-type Polyimide Resin and Preparation of Polyimide Wet Gel

Benzophenone-3,3',4,4'-tetracarboxylic anhydride, 4,4'-oxidianiline, 4,4'-diaminophenylsulfone were dissolved and reacted in N-methylpyrrolidone and toluene in a nitrogen ambient at a temperature of 25° C. to synthesize a polyamic acid resin, and the reaction temperature was raised to 180° C. to prepare a polyimide resin.

The degree of reaction was checked in real time by an infrared spectral spectroscopy. In the high temperature polymerization process, the reaction was performed until all amic acid groups (1540 cm-1) changed to imide groups (1725 cm-1, 1780 cm-1). Through this, it was confirmed that a polyimide resin having an imide group was prepared.

The monomers were added such that the total mole of acid anhydride monomers was 1.1 moles per 1 mole of diamine-based monomers, and a synthetic solvent was added such that a solid content of the resin finally became 10.5% by weight. When the content of diaminophenylsulfone, which is a polar monomer, was 25% by mole compared to the total mole of all the monomers used, a solution-type polyimide resin was prepared without forming particles.

To the solution-type polyimide resin prepared in the manner described above, lactic acid was added and mixed for about 3 hours until being dissolved. Next, a trifunctional amine group was added in an amount of 2% by weight with respect to the solid content of the resin, and the mixture was then stirred for 1 hour, was injected into a mold having a size of 20 mm×mm 80×2 mm, and was sufficiently crosslinked at 25° C. for 18 hours.

In Example 1, the degree of cross-linking was checked according to varying amounts of acid, and the results are shown in Table 1.

TABLE 1

| Content of lactic acid (with respect to a solid content of polyimide) | With or without formation of wet gel |
|---|---|
| 0 | X |
| 5 | Δ |
| 10 | ○ |
| 20 | ○ |
| 30 | ○ |

Referring to Table 1, the effect of the acid content on the formation of polyimide wet gels in a crosslinking reaction is shown. In other words, when the acid content was 10% by weight or higher, a stable wet gel was formed. On the other hand, when the content of a crosslinking agent was increased to 5% by weight, a wet gel was formed without using an acid. On the basis of the result, it was confirmed that an acid facilitated the crosslinking reaction and a wet gel was successfully formed even in conditions where the content of the crosslinking agent is low. Afterwards, 20% by weight of the acid and 2% by weight of the crosslinking agent were used.

Example 2

Preparation of Polyimide Aerogel Using Example 1

To the polyimide resin prepared in Example 1, an acid was added in an amount of 20% by weight with respected to the solid content of the resin and then mixed for 2 hours. Next, a trifunctional amine group was added in an amount of 2% by weight with respect to the solid content of the resin and was stirred for 1 hour. The mixture was injected into a mold having a size of 20 mm×mm 80×2 mm, and was sufficiently crosslinked at 25° C. for 18 hours. The polyimide wet gel prepared as described above was placed in a container in which NMP and a substituent solvent (hereinafter referred to as ES) were mixed, and the solvent substitution progressed.

In regard to substituent solvents ES, cyclohexane (hereinafter referred to as CH, surface tension: 24.4 mN/m, Ra(NMP): 14.4, Table 3) was used as a main substituent solvent, and toluene (hereinafter referred to as Tol, surface tension: 28.4 mN/m, Ra(CH): 3.3, Ra(NMP): 12.1, Table 3) was also used.

The weight ratio of NMP:ES was varied stepwise. First, NMP and ES were left as mixed in a weight ratio of 75:25 for 2 hours, left as mixed in a weight ratio of 50:50 2 hours, left as mixed in a weight ratio of 25:75 for 2 hours, and left as mixed in a weight ratio of 0:100 for 2 hours. The solvent substitution was performed stepwise, and finally a dry solvent was left for 2 hours in cyclohexane (CH). A total of 10 hours was spent for the solvent substitution. As the substituent solvents ES, CH, Tol, Tol, Tol, and CH were sequentially used in this order in respective steps. That is, CH was used only in the first step of the four-step solvent substitution process excluding the dry solvent step, and Tol was used in the subsequent steps.

Next, drying was performed in a vacuum oven at 30° C. for 2 hours, at 60° C. for 2 hours, and at 80° C. for 2 hours. Next, heat treatment was performed at 200° C. for 3 hours to finally produce a polyimide aerogel. A total of 9 hours was spent for the drying and heat treatment.

Example 3

Preparation of Polyimide Aerogel Using Example 1

In a solvent replacement process, the substituent solvents ES were used in the order of CH, CH, Tol, Tol, and CH (i.e., CH was used in the first and second steps of the four-step substitution process excluding the dry solvent step, and Tol was used in the subsequent steps), and the remaining part of the process was performed in the same manner as in Example 2.

Example 4

Preparation of Polyimide Aerogel Using Example 1

In a solvent substitution process, the substituent solvents ES were used in the order of CH, CH, CH, Tol, and CH (i.e., CH was used in the first, second, and third steps of the four-step solvent substitution process excluding for the dry solvent step, and Tol was used in the fourth step). The remaining part of the process was performed in the same manner as in Example 2.

Example 5

Preparation of Polyimide Aerogel Using Example 1

In a solvent substitution process, the substituent solvents ES were used in the order of CH, CH, CH, CH, CH, and CH (i.e., only CH was used as the ES in the solvent substitution process), and the remaining part of the process was performed in the same manner as in Example 2.

Example 6

Preparation of Polyimide Aerogel Using Example 1

In a solvent substitution process, the substituent solvents ES were used in the order of Tol, CH, CH, CH, CH, and CH (i.e., in the solvent substitution process, Tol was used only in the first step, and then CH was used in the subsequent steps), and the remaining part of the process was performed in the same manner as in Example 2.

Example 7

Preparation of Polyimide Aerogel Using Example 1

In a solvent substitution process, the substituent solvents ES were used in the order of Tol, Tol, CH, CH, and CH (i.e., Tol was used in the first and second steps of the four-step solvent substitution process, and CH was used in the subsequent steps). The remaining part of the process was performed in the same manner as in Example 2.

Example 8

Preparation of Polyimide Aerogel Using Example 1

In a solvent substitution process, the substituent solvents ES were used in the order of Tol, Tol, Tol, CH, and CH (i.e., Tol was used in the first and second steps, and CH was used in the subsequent steps), and the remaining part of the process was performed in the same manner as in Example 2.

Example 9

Synthesis of Solution-type Polyimide Resin and Preparation of Polyimide Aerogel Gel In a polyimide synthesis process in Example 1, a solution-type polyimide resin was prepared by using 30% by mole of diaminophenylsulfone as polar monomers with respect to the total mole of the monomers used and adding a synthetic solvent so that the solid content of the resin became 12% by weight. The preparation of an aerogel from the prepared polyimide resin was performed in the same manner as in Example 4 described above (the substituent solvents ES were used in the order of CHI, CH, CH, Tol, and CH during the solvent substitution process).

Example 10

Preparation of Polyimide Aerogel from Polyimide Resin of Example 9

In a solvent substitution process, the substituent solvents ES were used in the order of Tol, CH, CH, Tol, and CH (i.e., in the solvent substitution process, Tol was used in the first step used Tol unlike Example 9), and the remaining part of the process was performed in the same manner as in Example 9.

Example 11

Preparation of Polyimide Aerogel from Polyimide Resin of Example 9

In a solvent substitution process, the substituent solvents ES were used in the order of Tol, CH, Tol, Tol, and CH (i.e., Tol was used in the third step of the solvent substitution process unlike Example 10), and the remaining part of the process was performed in the same manner as in Example 9.

Example 12

Preparation of Polyimide Aerogel from Polyimide Resin of Example 9

To the polyimide resin solution synthesized in Example 9, NMP was added to lower the solid content to 8% by weight. The subsequent steps of the aerogel manufacturing process were performed in the same manner as in Example 11.

Comparative Example 1

Preparation of Polyimide Aerogel from Polyimide Wet Gel of Example 1

Unlike Examples 1 to 12, in a solvent substitution process, a complex organic solvent in which CH and Tol were mixed in a weight ratio of 50:50 was used as ES (i.e., in the steps of the solvent substitution process except for the dry solvent step, the complex organic solvent in which CH and Tol were mixed in a weight ratio of 50:50 was used), and the remaining part of the process was performed in the same manner as in Example 2.

Comparative Example 2

Preparation of Polyimide Aerogel from Particulate Polyimide Resin

In the polyimide synthesis process in Example 1, a particulate polyimide resin was prepared by using 15% by mole of diaminophenylsulfone as polar monomers with respect to the total mole of the monomers used and adding a synthetic solvent so that the solid content of the resin became 15% by weight. The particle size of the resin was within the range of 2 μm to 3 μm. Next, crosslinking, solvent substitution, and drying processes were performed in the same manner as in Comparative Example 1 (a complex organic solvent composed of CH and Tol was used).

Experimental Example 1

SEM Image Measurement Test of Polyimide Aerogel

In Experimental Example 1, the pore structures of the polyimide aerogels prepared through the examples and the comparative examples were analyzed using SEM images.

Figure 2:
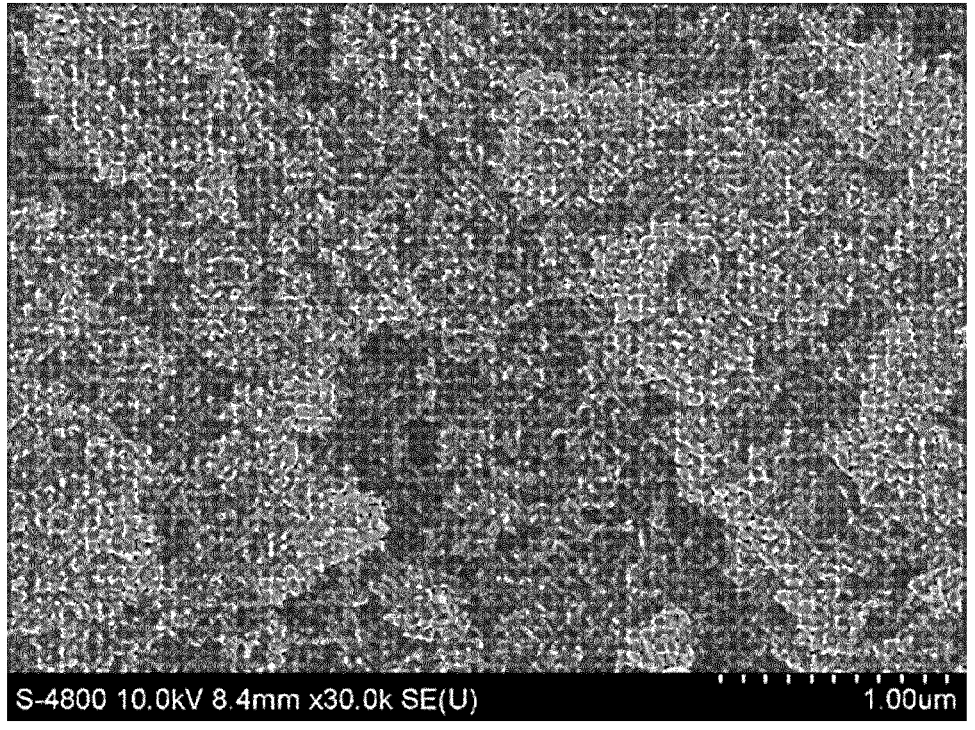
FIG. 2 is an SEM image illustrating the pore structure of polyimide aerogels according to Example 2.
Figure 3:
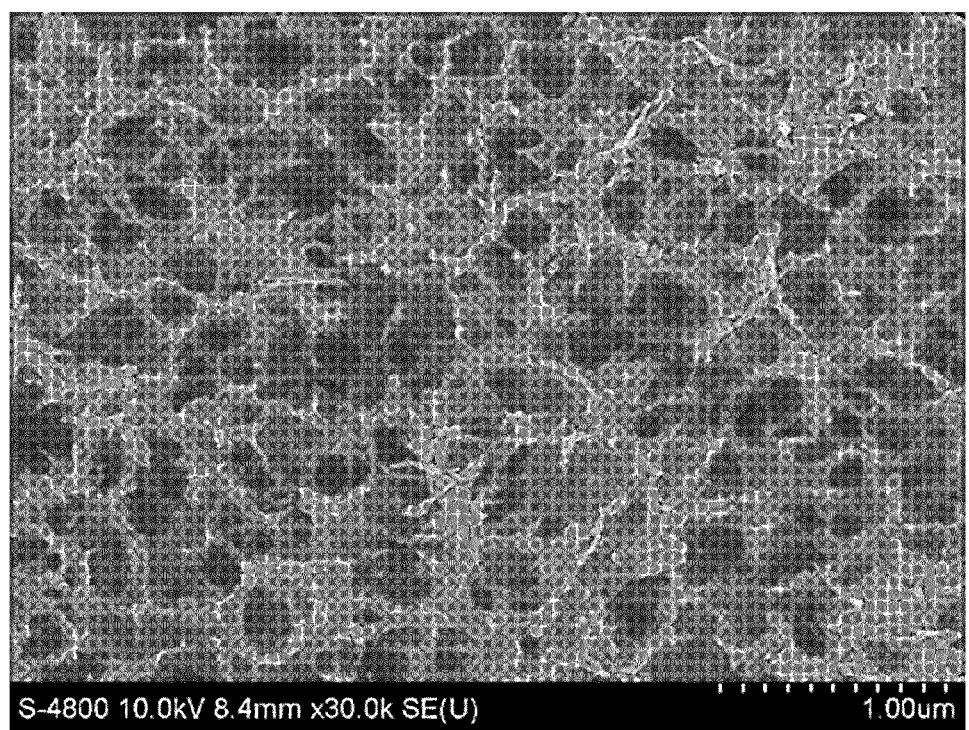
FIG. 3 is an SEM image illustrating the pore structure of polyimide aerogels according to Example 3.
Figure 4:
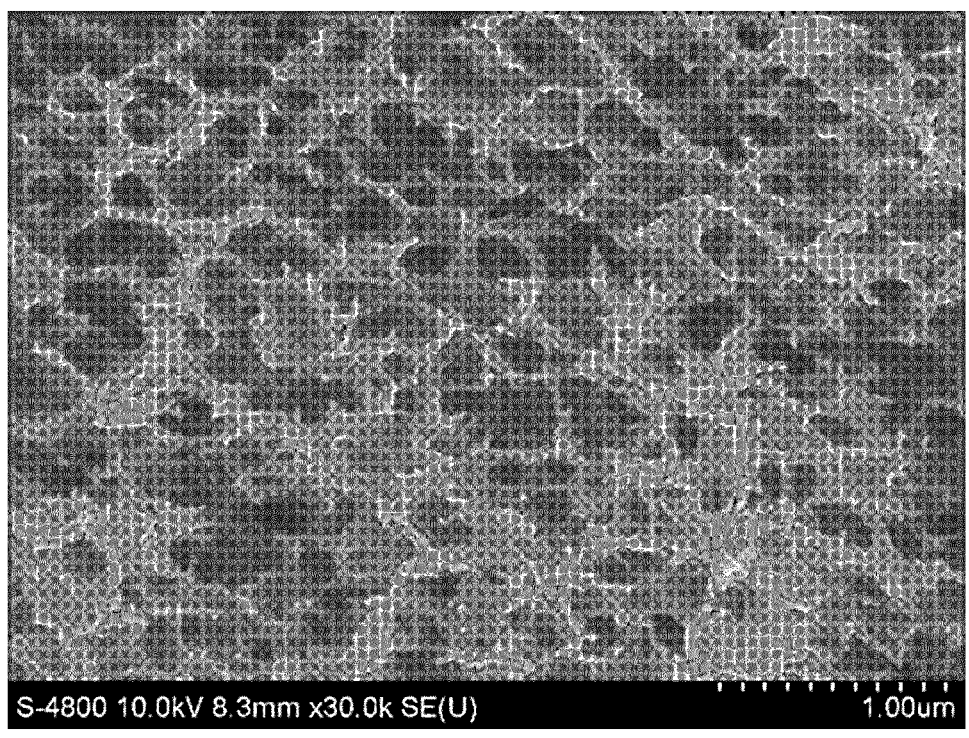
FIG. 4 is an SEM image illustrating the pore structure of polyimide aerogels according to Example 4.
Figure 5:
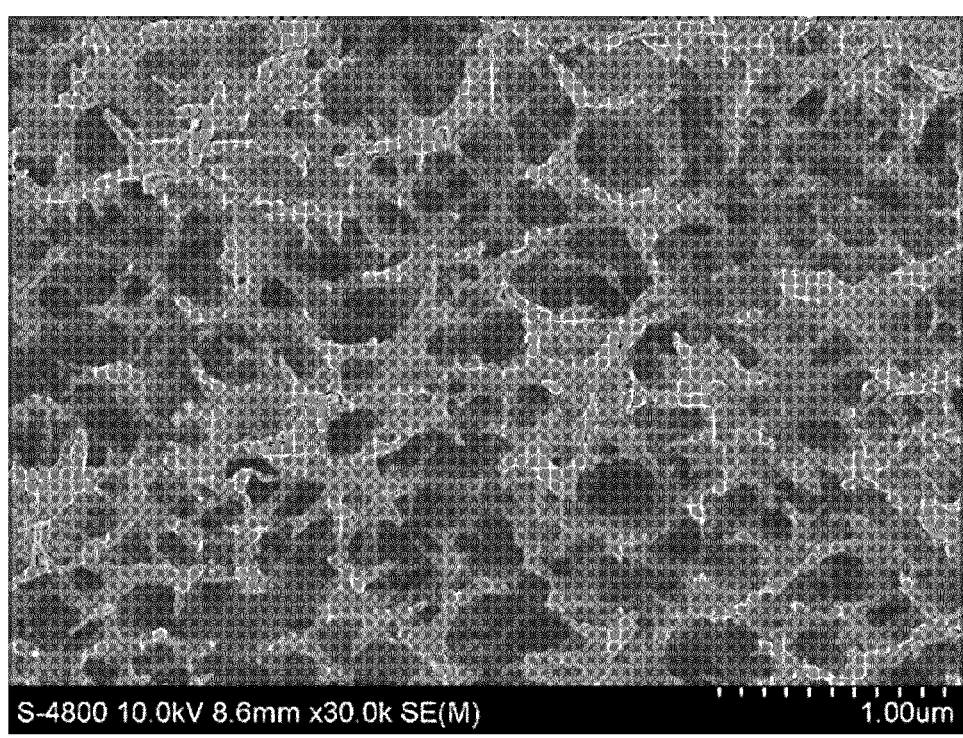
FIG. 5 is an SEM image illustrating the pore structure of polyimide aerogels according to Example 5.
Figure 6:
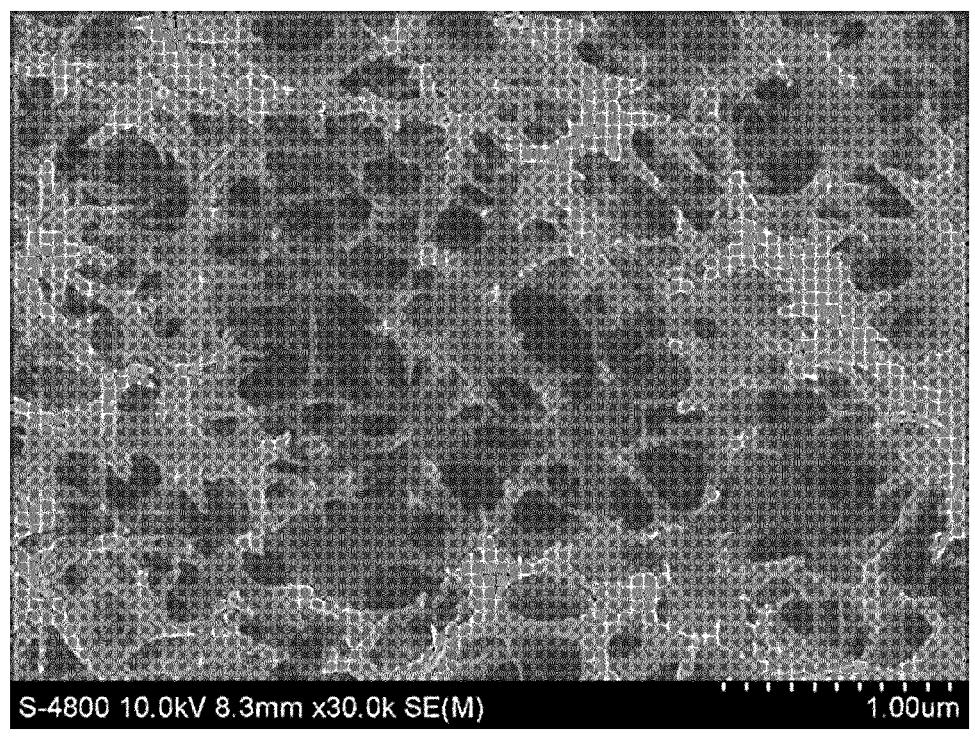
FIG. 6 is an SEM image illustrating the pore structure of polyimide aerogels according to Example 6.
Figure 7:
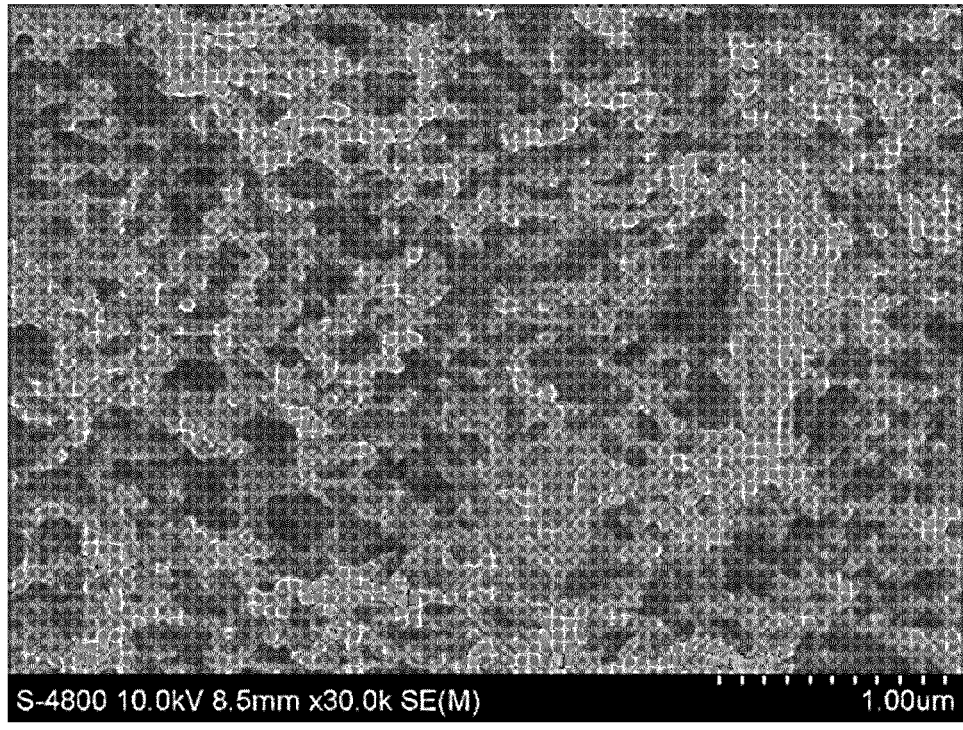
FIG. 7 is an SEM image illustrating the pore structure of polyimide aerogels according to Example 7.
Figure 8:
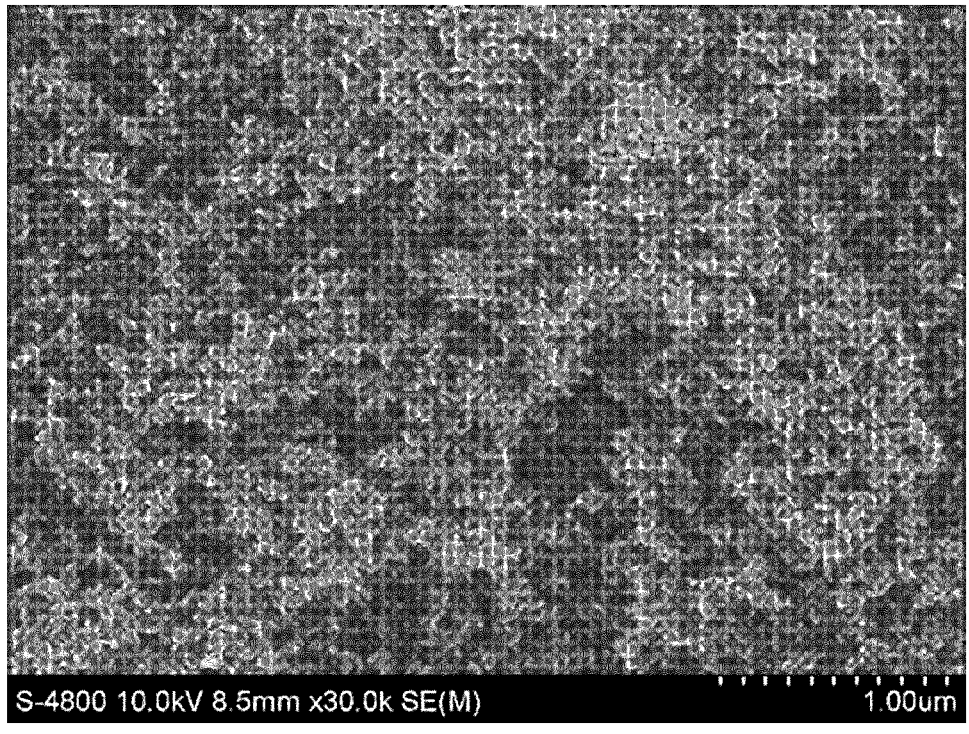
FIG. 8 is an SEM image illustrating the pore structure of polyimide aerogels according to Example 8.
Figure 9:
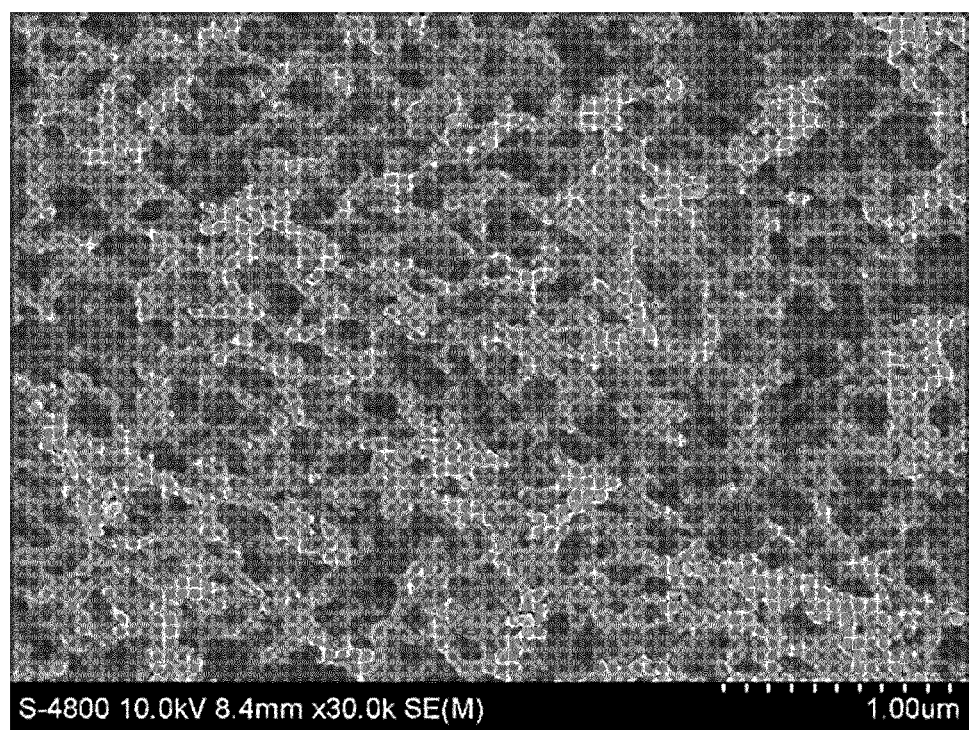
FIG. 9 is an SEM image illustrating the pore structure of polyimide aerogels according to Comparative Example 1.

FIG. 2 is a SEM image illustrating the pore structure of a polyimide aerogel according to Example 2, FIG. 3 is a SEM image illustrating the pore structure of a polyimide aerogel according to Example 3, FIG. 4 is a SEM image illustrating the pore structure of a polyimide aerogel according to Example 4, FIG. 5 is a SEM image illustrating the pore structure of a polyimide aerogel according to Example 5, FIG. 6 is a SEM image illustrating the pore structure of a polyimide aerogel according to Example 6, FIG. 7 is a SEM image illustrating the pore structure of a polyimide aerogel according to Example 7, FIG. 8 is a SEM image illustrating the pore structure of a polyimide aerogel according to Example 8, and FIG. 9 is a SEM image illustrating the pore structure of a polyimide aerogel according to Comparative Example 1.

That is, Examples 2 to 8 relate to aerogels prepared from the solution-type polyimide resin prepared in Example 1, and the pore structures observed from the SEM images are shown in FIGS. 2 to 9. With respect to Example 7, since the specimen became warped in the solvent substitution process and the drying process, the mechanical properties were not determined, and only the pore structure was analyzed.

Specifically, it can be seen that only the aerogels corresponding to Examples 3 to 6 exhibit a nano-pore skeletal structure. This observation result teaches that the nano-pore skeletal structure can be obtained by using CH as the main substituent solvent in the second step of the solvent substitution process. In the cases where CH is not used in the second substitution step of the multi-step substitution process, nanoparticles occurred in the pore structures. In the case of Comparative Example 1 in which a complex organic solvent of CH and Tol was used as substituent solvents, it is recognized that the skeletal structure and the nanoparticles are mixed.

Experimental Example 2

Testing of Mechanical Properties of Polyimide Aerogels

In Experimental Example 2, the apparent density was determined from the weight and dimensions of each of the polyimide aerogel specimens obtained in the examples and comparative examples, and the volume porosity was obtained from the true density (1.40 g/cm3, measured with a pyconometer) using Calculation Formula 1 below.

$$Porosity = \{1 - (apparent\ density)/(true\ density)\} * 100 \quad \text{[Formula 1]}$$

To measure mechanical properties, a universal testing machine (UTM) was used. The flexural properties were measured in a three-point bending mode, and the modulus, strength, and ultimate strain were determined from the flexural properties. The results are shown in Table 2 (NB stands for no break).

TABLE 2

| | Solvent substitution process | | | | | Physical property | | | | |
| | First | Second | Third | Fourth | Fifth Solvent system | | | | | |
| | NMP:ES 75:25 | NMP:ES 50:50 | NMP:ES 25:75 ES type | NMP:ES 0:100 | NMP:ES 0:100 | Density g/mm³ | Porosity(%) % by volume | Modulus MPa | Strength MPa | Ultimate strain(%) % |
|---|---|---|---|---|---|---|---|---|---|---|
| Example 2 | CH | Tol | Tol | Tol | CH | 0.727 | 48.1 | 561 | 13.1 | 2.6 |
| Example 3 | CH | CH | Tol | Tol | CH | 0.269 | 80.8 | 141 | 5.5 | 4.8 |
| Example 4 | CH | CH | CH | Tol | CH | 0.298 | 78.7 | 205 | 10.3 | 6.0 |
| Example 5 | CH | CH | CH | CH | CH | 0.528 | 62.3 | 240 | 11.8 | 4.7 |
| Example 6 | Tol | CH | CH | CH | CH | 0.333 | 76.2 | 255 | 14.1 | 12.4 |
| Example 7 | Tol | Tol | CH | CH | CH | — | — | — | — | — |
| Example 8 | Tol | Tol | Tol | CH | CH | 0.433 | 69.1 | 131 | 7.3 | 7.6 |
| Example 9 | CH | CH | CH | Tol | CH | 0.295 | 78.9 | 344 | 20.5 | 11.8 |
| Example 10 | Tol | CH | CH | Tol | CH | 0.315 | 77.5 | 372 | 20.0 | 10.7 |
| Example 11 | Tol | CH | Tol | Tol | CH | 0.272 | 80.6 | 334 | 17.5 | Nb |
| Example 12 | Tol | CH | Tol | Tol | CH | 0.209 | 85.1 | 147 | 7.4 | Nb |
| Comparative Example 1 | CH:Tol | CH:Tol | CH:Tol | CH:Tol | CH | 0.262 | 81.3 | 47 | 2.5 | 5.8 |
| Comparative Example 2 | CH:Tol | CH:Tol | CH:Tol | CH:Tol | CH | 0.419 | 70.1 | 118 | 6.6 | 6.6 |
| Note | | Gel structural formation | | | dry solvent | | | | | |

The physical properties of the solvents used in the examples and comparative examples are shown in Table 3.

TABLE 3

| Solvent | $\gamma_{lv}$(mN/m) | bp(° C.) | $\delta_d$(MPa$^{1/2}$) | $\delta_p$(MPa$^{1/2}$) | $\delta_h$(MPa$^{1/2}$) | Ra(NMP)(MPa$^{1/2}$) | Ra(CH)(MPa$^{1/2}$) |
|---|---|---|---|---|---|---|---|
| CH | 24.4 | 81 | 16.8 | 0.0 | 0.2 | 14.4 | 0 |
| Tol | 28.4 | 111 | 18.0 | 1.4 | 2.0 | 12.1 | 3.3 |
| NMP | 40.7 | 202 | 18.0 | 12.3 | 7.2 | 0 | 14.4 |

$\gamma_{lv}$: Surface tension
bp: Boiling point
$\delta_d$, $\delta_p$, $\delta_h$: Hansen solubility parameter (HSP) (dispersion/polar/hydrogen term)
Ra(NMP): HSP distance with NMP
Ra(CH): HSP distance with CH Referring to Tables 2 and 3, it can be seen that the polyimide aerogel of Comparative Example 1 prepared from a solution-type polyimide resin has an improved porosity of approximately 70% to 80% compared to the polyimide aerogel of Comparative Example 2 prepared from a particulate polyimide resin. However, in the case of the polyimide aerogel of Comparative Example 1, the modulus which is a mechanical strength indicator significantly decreased with increasing porosity compared to the case of the polyimide aerogel of Comparative Example 2. The polyimide aerogel of Example 5 in which the solvent substitution was performed with the use of only CH exhibited a significantly lower porosity than the polyimide aerogels of Examples 3 and 4 in which CH and Tol were used as a main substituent solvent and a sub-substituent solvent, respectively, in the solvent substitution process. Since CH is a solvent with poor affinity for NMP (synthetic resin) and polyimide (CH:Ra (NMP)=14.4, see Table 3), it is determined that the NMP remains after the solvent substitution process is completed within a given time, resulting in significant shrinkage during the drying process. On the other hand, when Tol is used after the second step of the solvent substitution process in which the skeletal structure is formed is performed, as in the case of Examples 3 and 4, since Tol has good affinity for CH (Tol:Ra(CH)=3.3, see Table 3) and for NMP and polyimide (Tol:Ra(NMP)=12.1, see Table 3), good conditions in which NMP can be easily replaced with can be formed. When CH is used in the last step, since CH has good affinity with Tol(Tol:Ra(CH)=3.3, see Table 3), it is determined that an environment in which the solvent contained in the wet gel can be substituted by CH is created in the last step, and the porosity is improved after the drying.

In addition, even in the case where the sub-substituent solvent is used in the first step of the solvent substitution process, a skeletal structure having a nanopore shape appears. That is, it is considered that the solvent environment (NMP:ES=50:50) of the second step of the solvent substitution process plays a crucial role in forming the gel structure and the final pore structure. However, compared to Examples 3 and 4, the porosity of Example 6 is slightly reduced. This is understood to be a phenomenon caused by the continuous use of CH without the use of Tol after the use of CH in the second step of the solvent substitution process. This is similar to the result of Example 5.

In addition, solution-type polyimide resins with different structures were synthesized by increasing the solid content of the polyimide resin and varying the polar monomer content, and the polyimide aerogels were prepared using the solution-type polyimide resins in Examples 9 and 12. The physical properties of the polyimide aerogels were measured. Since CH was similarly used in the second step of the solvent substitution process, it was confirmed that the polyimide aerogels of Examples 9 to 12 all had a nano-pore skeletal structure.

Referring to Examples 4 and 9, the porosity of each of the aerogels of Examples 4 and 9 was equally about 80%, and the mechanical strength was improved in the case of Example 9. It is considered that such an improvement was attributed to the structural change of the polyimide. This means that it is necessary to adjust the weight ratio of appropriate polar monomers and the solid content.

Referring to the test results of Examples 9, 10, and 11, since Tol, a sub-substituent solvent, was used in the first step of the solvent substitution process, the aerogel of Example 10 exhibited similar porosity and strength with the aerogel of Example 9. The aerogel of Example 11 exhibited a similar level of strength but an improved level of toughness to the extent that the specimen was not destroyed during the flexural strength test.

The reason for using Tol in the first step of the solvent substitution process is to facilitate CH penetration in the second step in which the gel structure is to be formed. This is because within a solvent substitution process time (2 hours) of the first step, a more amount of Tol will penetrate into the gel than CH (CH:Ra(NMP)=14.4, Tol:Ra(NMP) =12.2, see Table 3). Subsequently, when CH that is favorably compatible with Tol penetrates (CH:Ra (Tol)=3.3) while replacing the Tol, a larger amount of CH can penetrate into the gel within the predetermined time, and the skeletal structure can be smoothly formed.

In particular, the polyimide aerogel prepared in Example 11 had similar modulus and strength at a similar level of porosity but exhibited a significantly increased ultimate strain. On the basis of these results, it can be seen that the skeletal structure as a whole is well formed, and thus the resistance to mechanical deformation has increased.

In Examples 11 and 12, the amount of the solvent contained in the polyimide wet gel was increased by lowering the solid content of the polyimide resin. As a result, it was found that the porosity significantly increased to about 85%, particularly in the case of Example 12. The modulus decreased with the increased modulus. However, it was confirmed that the polyimide aerogel had a better mechanical strength than the polyimide aerogels of Comparative Examples 1 and 2 as shown in Table 2 despite the porosity thereof was higher than that of Comparative Examples 1 and 2. That is, in the case of using a solution-type polyimide resin and adding a main substituent solvent and a sub-substituent solvent in a stepwise manner, rather than using particulate polyimide resins or complex organic solvents, it is possible to increase the porosity to 80% by volume or more and increase the strength.

Experimental Example 3

Testing of Electrical Properties of Polyimide Aerogels

In Experimental Example 3, the prepared polyimide aerogels were molded to produce sheets of polyimide aerogel, and the electrical properties thereof were measured.

By using the same polyimide aerogel manufacturing method as in Example 9, a polyimide aerogel was manufactured. The polyimide aerogel was molded into a specimen, using a mold having a size of 100 mm×100 mm×2 mm. The specimen is referred to as a specimen A.

By using the same polyimide aerogel manufacturing method as in Example 11, a polyimide aerogel was manufactured. The polyimide aerogel was molded into a specimen, using a mold having a size of 100 mm×100 mm×2 mm. The specimen is referred to as a specimen B.

By using the same polyimide aerogel manufacturing method as in Example 12, a polyimide aerogel was manufactured. The polyimide aerogel was molded into a specimen, using a mold having a size of 100 mm×100 mm×2 mm. The specimen is referred to as a specimen C.

By using the same polyimide aerogel manufacturing method as in Comparative Example 1, a polyimide aerogel was manufactured. The polyimide aerogel was molded into a specimen, using a mold having a size of 100 mm×100 mm×2 mm. The specimen is referred to as a specimen D.

By using the same polyimide aerogel manufacturing method as in Comparative Example 2, a polyimide aerogel was manufactured. The polyimide aerogel was molded into a specimen, using a mold having a size of 100 mm×100 mm×2 mm. The specimen is referred to as a specimen E.

The dielectric properties of each of the manufactured specimens were measured at 5 GHz with an impedance analyzer. The dielectric breakdown voltage was evaluated by measuring the maximum application voltage at which a breakdown occurs while increasing the application voltage (1.5 kV/s) after inserting each specimen between 20-mm ball electrodes. The results are shown in Table 4.

TABLE 4

| | Physical property | | | | |
| Spec-imen | Density $(g/cm^3)$ | Porosity (vol %) | Dielectric constant | Dielectric loss (tan δ) | Dielectric breakdown voltage (kV/mm) |
|---|---|---|---|---|---|
| A | 0.312 | 77.7 | 1.44 | 0.0093 | 31.4 |
| B | 0.289 | 79.4 | 1.38 | 0.0068 | 35.0 |
| C | 0.191 | 86.3 | 1.23 | 0.0052 | 17.5 |
| D | 0.315 | 77.5 | 1.44 | 0.0068 | 30.0 |
| E | 0.433 | 69.1 | 1.47 | 0.0067 | 14.6 |

It was confirmed that each of the specimens A, B, C, D, and E had a porosity similar to that of the bar-shaped polyimide aerogels of Examples 9, 11, 12 and Comparative Examples 1 and 2. At a porosity level of 80%, most of the specimens exhibited an extremely low dielectric constant of 1.4 (dielectric loss of 10-3 grade). Especially, it was confirmed that the specimen C exhibited a porosity increased to about 86% and an extremely low dielectric constant of 1.23 (dielectric loss of 10-3 grade). The dielectric breakdown strength was highly influenced by the polyimide resin shape. For example, the specimen E exhibited a significantly lower dielectric breakdown voltage than the other specimens although it had a lower porosity than the other specimens. That is, it is considered that the polyimide aerogels made from a particulate polyimide resin are mechanically and electrically vulnerable due to interfacial defects around the microparticles.

On the other hand, the specimen C with the highest porosity exhibited better electrical properties than the low-porosity specimen E made from a particulate polyimide resin even though the specimen C had a slightly lower dielectric strength than the specimens A and B. As a result, it is confirmed that the specimen C has an excellent dielectric strength of 17.5 kV/mm although it has an extremely low dielectric constant of 1.23. That is, the specimen C has good electrical properties.

The examples and experimental examples described above relate to a method of manufacturing a polyimide aerogel having low dielectric constant, high electrical insulation performance, and high mechanical strength, and a polyimide aerogel manufactured thereby. A solvent contained in a polyimide wet gel is substituted by a main substituent solvent and a sub-substituent solvent, and the solvent-substituted gel is then dried to prepare a polyimide aerogel. The main substituent solvent and the sub-substituent solvent are added stepwise to the polyimide wet gel. Through this solvent substitution, the polyimide aerogel having a porosity of 80% to 85% by volume and a nano-pore skeletal structure can be manufactured.

As described above, the present invention has great significance in that it is possible to synthesize a solution-type polyimide resin and to synthesize a highly porous polyimide aerogel having a nano-pore skeletal structure after final drying through the control of step-by-step addition of the main substituent solvent and the sub-substituent solvent in the solvent substitution process.

Since the highly porous polyimide aerogel prepared as described herein has not only low dielectric constant but also high mechanical strength and high electrical insulation performance, it is expected that the polyimide aerogel can be used in various applications such as low dielectric substrate materials, insulating protective films, insulation materials, sound-absorbing materials, membranes, and adsorbent materials.

The embodiments that have been described herein above are merely illustrative of the technical idea of the present invention, and thus various modifications, changes, alterations, substitutions, subtractions, and additions may also be made by those skilled in the art without departing from the gist of the present disclosure. The embodiments disclosed in the present disclosure are not intended to limit the scope of the present invention and the technical spirit of the present invention should not be construed as being limited to the embodiments. The protection scope of the present disclosure should be construed as defined in the following claims, and it is apparent that all technical ideas equivalent thereto fall within the scope of the present invention.

What is claimed is:

1. A method of manufacturing a polyimide aerogel having low dielectric constant, high insulation performance, and high strength, the method comprising:

a first step of preparing a solvent;

a second step of preparing a polyamic acid resin by reacting a diamine-based monomer and an acid anhydride monomer under the solvent;

a third step of preparing a polyimide resin solution by imidizing the polyamic acid resin at a temperature in a range of 150° C. to 200° C.;

a fourth step of preparing a polyimide wet gel by mixing a crosslinking agent and an acid with the polyimide resin solution; and a fifth step of preparing a polyimide aerogel by replacing a solvent contained in the polyimide wet gel with a main substituent solvent and a sub-substituent solvent, and then drying the solvent, wherein in the fifth step, the main substituent solvent and the sub-substituent solvent are added in a stepwise manner to the polyimide wet gel to replace the existing solvent in the polyimide wet gel, thereby producing a polyimide aerogel having a nano-pore skeletal structure and a porosity of 80% to 85% by volume.

2. The method of claim 1, wherein the solvent used in the first step has higher solubility for the polyimide resin solution used in the third step.

3. The method of claim 1, wherein the acid used in the fourth step may be one or more acids selected from among acetic acid, lactic acid, butyric acid, benzoic acid, citric acid, phosphoric acid, and hydrochloric acid.

4. The method of claim 1, wherein a Hansen solubility parameter (HSP) distance between the solvent of the polyimide resin solution and the main substituent solvent is equal to or greater than 14.

5. The method of claim 1, wherein an HSP distance between the solvent of the polyimide resin solution and the sub-substituent solvent is less than 14.

6. The method of claim 1, wherein the main substituent solvent comprises one or more solvents selected from among hexane, cyclohexane, octane, pentane, and perfluorohexane, and the sub-sub-substituent solvent is any one or more substituents selected from among toluene, tetrahydrofuran, cyclohexanone, and methyl isobutyl ketone.

* * * * *